United States Patent [19]

Spatafora

[11] Patent Number: 5,740,902
[45] Date of Patent: Apr. 21, 1998

[54] METHOD AND UNIT FOR EQUALLY SPACING PRODUCTS, IN PARTICULAR FOOD PRODUCTS

[75] Inventor: Mario Spatafora, Bologna, Italy

[73] Assignee: Azionaria Costruzioni Macchine Automatiche A.C.M.A., S.p.A., Bologna, Italy

[21] Appl. No.: 555,329

[22] Filed: Nov. 8, 1995

[30] Foreign Application Priority Data

Nov. 11, 1994 [IT] Italy .................. BO94A0495

[51] Int. Cl.⁶ .................................. B65G 47/26
[52] U.S. Cl. ........................ 198/459.2; 198/459.8
[58] Field of Search .................. 198/459.2, 459.8, 198/461.1, 461.2, 471.1, 475.1, 459.1

[56] References Cited

U.S. PATENT DOCUMENTS

| | | |
|---|---|---|
| 2,392,523 | 1/1946 | Cramer . |
| 4,077,524 | 3/1978 | Rysti .................. 198/459.1 |
| 4,261,457 | 4/1981 | Van Maanen ............ 198/459.2 |
| 4,408,435 | 10/1983 | Sutton .................. 198/459.8 X |
| 5,318,165 | 6/1994 | Spatafora .................. 198/433 |
| 5,480,021 | 1/1996 | Belvederi et al. ............ 198/471.1 |

FOREIGN PATENT DOCUMENTS

| | | |
|---|---|---|
| 0371474 | 6/1990 | European Pat. Off. . |
| 1309976 | 12/1962 | France . |
| 2008497 | 1/1970 | France . |

*Primary Examiner*—James R. Bidwell
*Attorney, Agent, or Firm*—Ladas & Parry

[57] ABSTRACT

A method and unit for equally spacing product, in particular food products, whereby the products are fed at a constant rate along at least part of the initial portion of a product supply path, are withdrawn along the initial path portion by the head of a respective accelerating member, and are fed in equally spaced manner, at the aforementioned rate, and at a transfer and unloading station, to an end portion of the path; the head presenting a movement crosswise to the initial portion of the path to engage and lift the respective product off the initial path portion at a pickup point varying from one product to another.

23 Claims, 4 Drawing Sheets

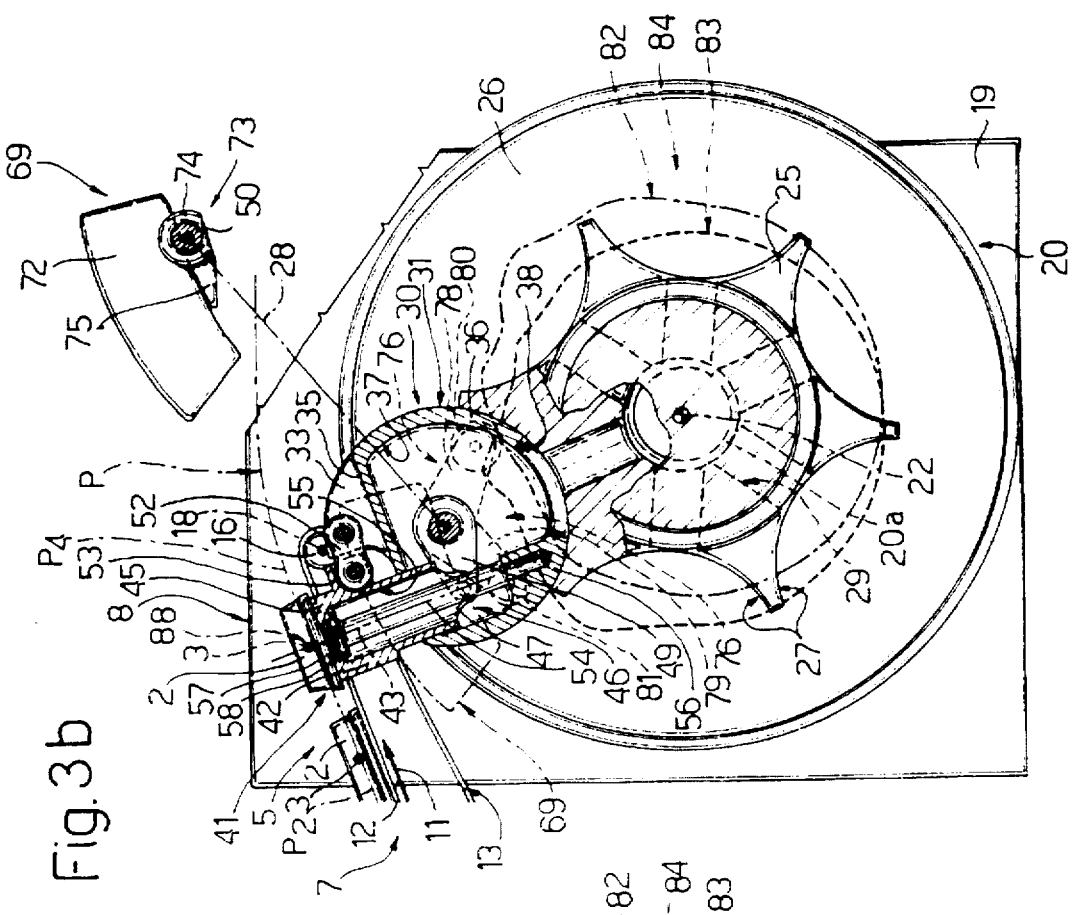
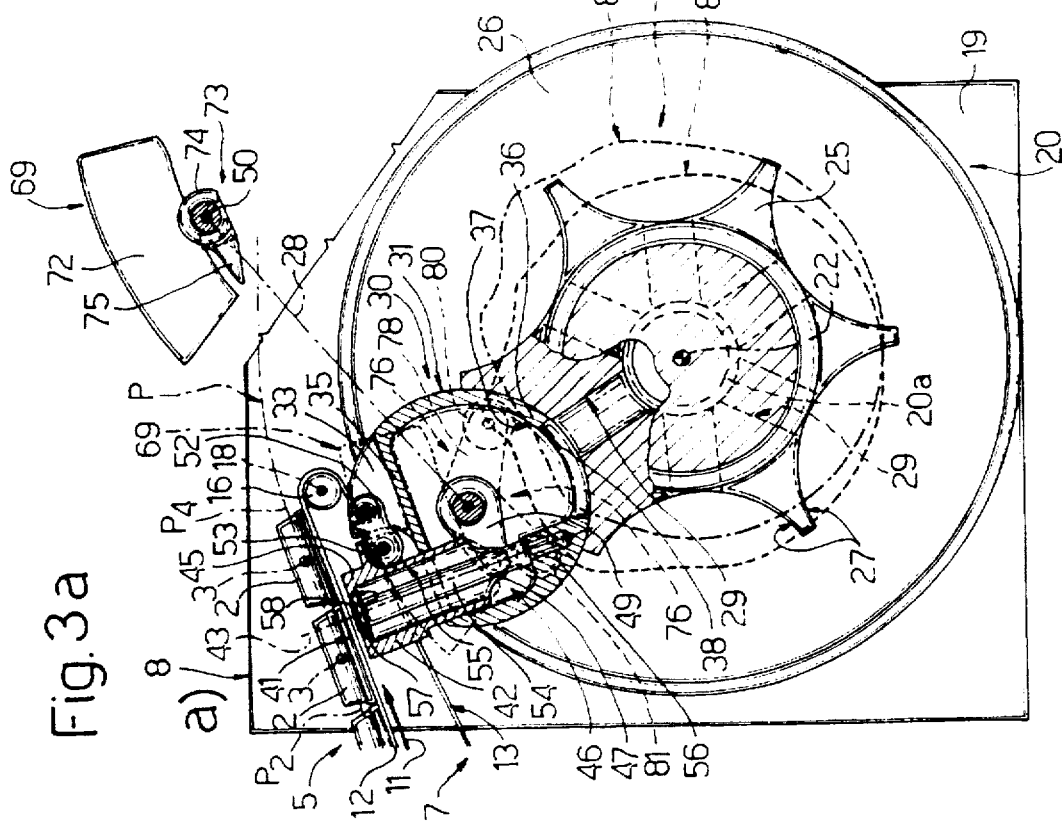

5,740,902

METHOD AND UNIT FOR EQUALLY SPACING PRODUCTS, IN PARTICULAR FOOD PRODUCTS

BACKGROUND OF THE INVENTION

The present invention relates to a method of equally spacing products, in particular food products.

In the following description, specific reference is made purely by way of example to the equal spacing of food products.

In the food industry, products are fed along a conveyor line, to the input of which they are supplied at random, and at the output of which they are equally spaced for supply to a user, e.g. wrapping, machine.

On known conveyor lines of the above type, such as that described in U.S. Pat. No. 5,318,165, equal spacing of the products normally involves accelerating them by means of an accelerating member, which normally receives the products contacting one another, and which provides for separating them into an orderly equally spaced succession.

On known conveyor lines of the above type, the accelerating member is normally defined by a conveyor traveling beneath and faster than the products, and presenting a succession of equally spaced gripping members, each of which catches up with and picks up a respective product as it travels along.

Though highly efficient, the above method adopted on known conveyor lines presents several drawbacks, foremost of which is the possibility of slippage between the products and the accelerating member, the consequences of which may be minimized but not entirely eliminated.

SUMMARY OF THE INVENTION

It is an object of the present invention to provide a method of equally spacing products, which provides not only for overcoming the aforementioned drawback, but also for ensuring extremely accurate spacing of the products.

It is a further object of the present invention to provide a method of equally spacing products, which provides for compensating for any difference in the size of the products.

According to the present invention, there is provided a method of equally spacing products, in particular food products; the method comprising a feed stage wherein the products are fed at a constant rate along at least part of the initial portion of a product supply path; a gripping stage wherein each product, as it travels along said initial portion of said path, is gripped by the head of a respective accelerating member and fed to an unloading station where it is transferred to an end portion of said path, the accelerating members being fed through the unloading station in equally spaced manner and at said rate; and a final stage wherein the products are fed with said spacing and at said rate along said end portion of the path; characterized in that said gripping stage comprises a substage wherein said head is imparted a movement crosswise to the initial portion of the path, to engage and lift the respective product off the initial path portion at a pickup point.

According to a preferred embodiment of the above method, each said head moves through said initial path portion to engage the respective product.

In the above method, said pickup point preferably varies from one product to another along said initial path portion; and said gripping stage preferably comprises a further substage wherein each said head is moved parallel to said initial path portion, said pickup point coinciding with the point, along said initial path portion, at which the respective positions of said head and the relative product correspond.

Also, at least close to the pickup point, each accelerating member is preferably moved at a speed greater than the traveling speed of the relative product.

The present invention also relates to a unit for equally spacing products, in particular food products.

According to the present invention, there is provided a unit for equally spacing products, in particular food products; the unit comprising an input conveyor device and an output conveyor device for respectively feeding a succession of products along the initial portion and the end portion of a given path, and an intermediate conveyor device for successively transferring the products from a pickup point along the initial path portion to an unloading station where the products are transferred to the end portion; the intermediate and output conveyor devices feeding the products at the same rate; the intermediate conveyor device being an accelerating device comprising a number of equally spaced accelerating members traveling at said rate through the unloading station; and each said accelerating member comprising a gripping head for gripping a respective said product; characterized in that each accelerating member comprises a body supporting the relative gripping head and movable crosswise to said initial path portion to engage and lift the respective product off the initial path portion at said pickup point.

According to a preferred embodiment of the above unit, each accelerating member comprises actuating means for moving the relative gripping head through the initial path portion.

In the above unit, said pickup point preferably varies from one product to another along said initial path portion; and the intermediate conveyor device preferably comprises transmission means for each accelerating member, for translating the respective gripping head parallel to said initial path portion; said pickup point coinciding with the point, along said initial path portion, at which the respective positions of the gripping head and the relative product coincide.

Also, the above unit preferably comprises detecting means for determining the displacement of each product along said initial path portion, and so determining in advance the location of said pickup point along the initial path portion.

BRIEF DESCRIPTION OF THE DRAWINGS

A non-limiting embodiment of the present invention will be described by way of example with reference to the accompanying drawings, in which:

FIG. 3 shows a partially sectioned view, with parts removed for clarity, of a detail of the FIG. 1 unit in two different operating positions;

DETAILED DESCRIPTION OF THE INVENTION

Figure 1:
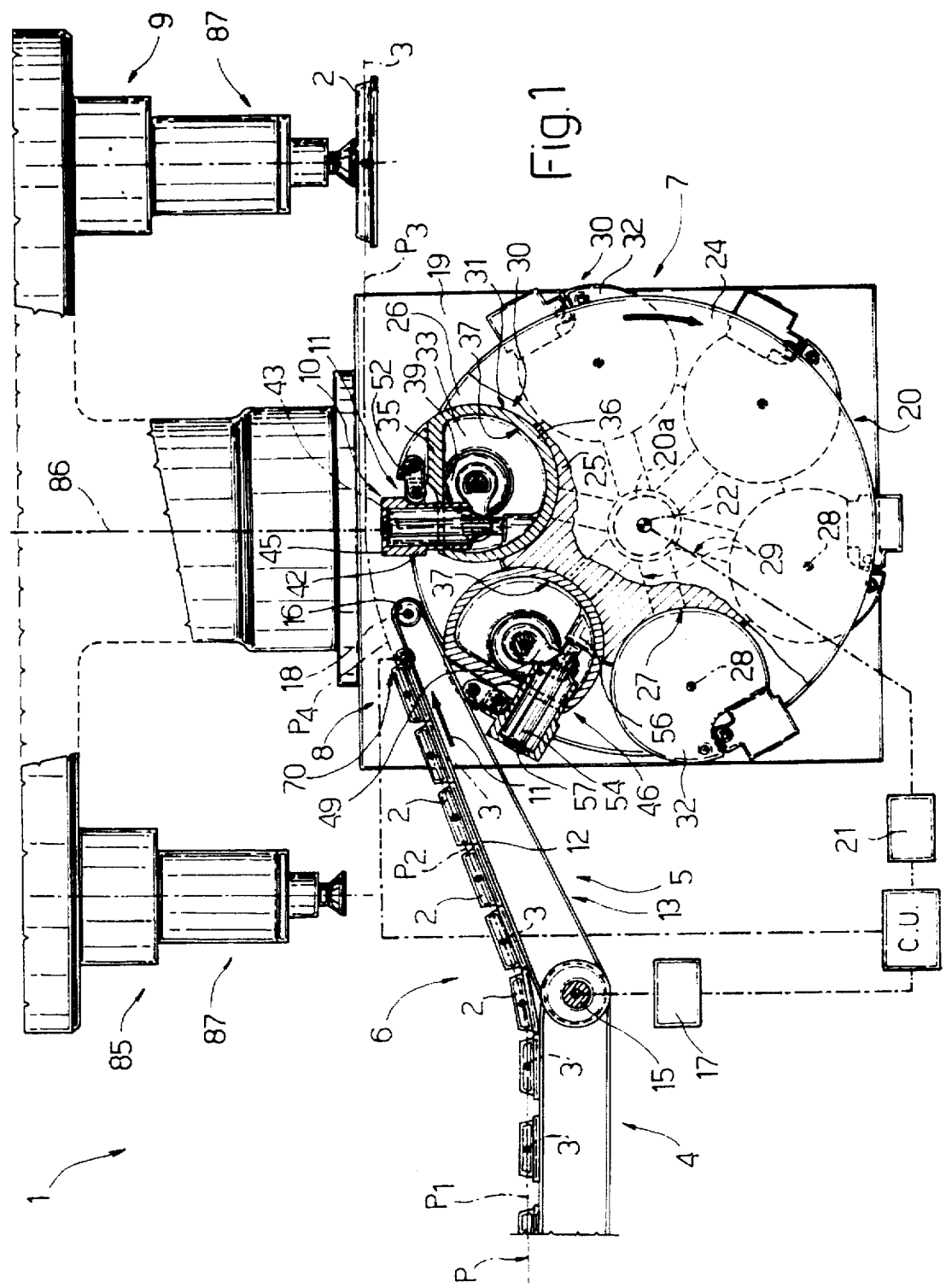
FIG. 1 shows a side view, with parts in section and parts removed for clarity, of a unit for supplying food products in equally spaced manner to a user machine, in particular a wrapping machine, in accordance with the teachings of the present invention.

Number 1 in FIG. 1 indicates a unit for supplying a user machine (not shown)—in particular a wrapping machine —with equally spaced food products 2—in the example shown, chocolate bars substantially in the form of an elongated parallelepipedon with a longitudinal axis 3.

Unit 1 comprises an input conveyor device 4 and a compacting conveyor device 5 respectively defining a straight first portion P1 and a straight second portion P2 of the path P of products 2; a transfer conveyor device 7 for successively removing products 2 from conveyor device 5 at a loading station 8 along portion P2; and an output conveyor device 9 for receiving products 2 in equally spaced manner from conveyor device 7 at an unloading station 10 downstream from station 8 along path P, and for feeding products 2 in equally spaced manner along a third output portion P3 of path P.

As shown in FIG. 1, input conveyor device 4 receives products 2 at random from a supply device (not shown), and feeds them to a transfer station 6 where they are fed on to conveyor device 5, which travels at a constant speed slower than that of conveyor device 4, so as to compact products 2 into an orderly succession in which they substantially contact one another.

Figure 2:
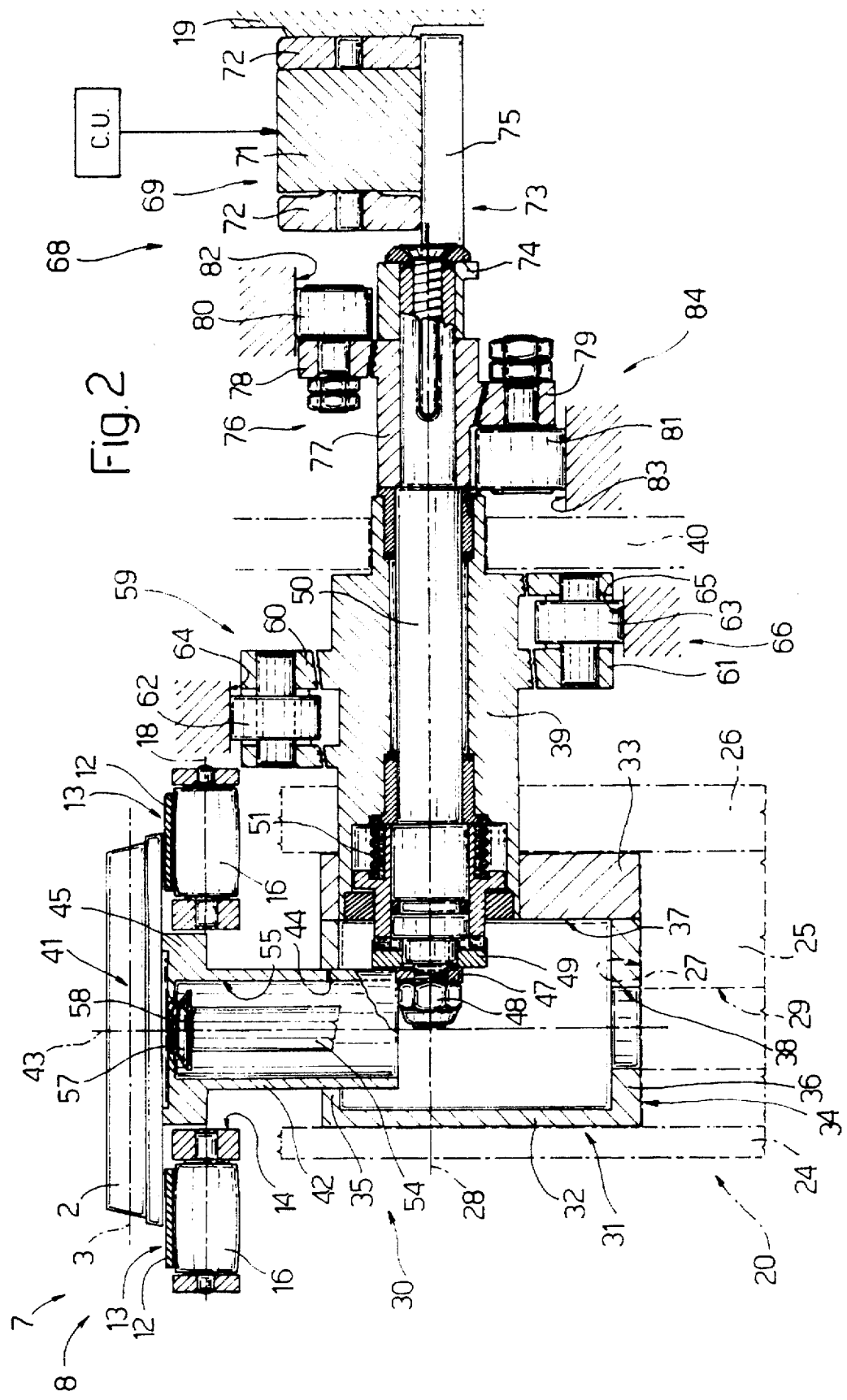
FIG. 2 shows a larger-scale section, with parts removed for clarity, of a detail of the FIG. 1 unit.

As shown in FIG. 1, conveyor device 5 feeds products 2 in a direction 11 crosswise to respective axes 3 and sloping slightly upwards from station 6, and, as shown more clearly in FIG. 2, is defined by the top branches 12 of a pair of side by side belts 13 separated by a distance smaller than the length of products 2, so as to define a passage 14 extending parallel to direction 11 and beneath products 2. Belts 13 are looped about respective pairs of pulleys 15 and 16, of which pulleys 15 are driven by a motor 17 (shown schematically in FIG. 1), and pulleys 16 are located close to station 8 and rotate about a substantially horizontal axis 18 crosswise to direction 11.

Conveyor device 7 feeds products 2 in equally spaced manner along a portion P4 of path P, extending between stations 8 and 10, and comprises a vertical base 19, and a conveyor wheel 20 supported on base 19 and driven by a motor 21 (shown schematically in FIG. 1) controlled in known manner, together with motor 17, by a a control unit CU, and which rotates wheel 20 clockwise (in FIG. 1) in relation to base 19, about an axis 22 parallel to axis 18, and at a surface speed greater than the traveling speed of conveyor device 5.

As shown in FIGS. 1, 2 and 3, wheel 20 comprises a central tubular body 20a fitted in rotary manner to base 19, connected to motor 21 so as to rotate clockwise (in FIG. 1) at constant angular speed about axis 22, and communicating via base 19 with a suction device (not shown). Wheel 20 also comprises three disks 24, 25, 26 fitted to tubular body 20a, and of which disk 25 is located directly beneath passage 14, disk 24 is a front disk, and disk 26 is located on the opposite side of disk 25 to disk 24 and in an intermediate position between disk 25 and base 19. Disk 25 is smaller in diameter than disks 24 and 26, and presents a number of cylindrical peripheral seats 27, the axes 28 of which are parallel to and equally spaced about axis 22, and each of which seats 27 communicates with said suction device (not shown) via a respective radial conduit 29 in disk 25 and via tubular body 20a.

Conveyor device 7 also comprises a number of accelerating members 30, each housed inside a respective seat 27 and rotating both with wheel 20 about axis 22 and in relation to wheel 20 about a respective axis 28. Each member 30 comprises a cylindrical box frame 31 coaxial with respective axis 28, and in turn comprising two flat end walls 32, 33 respectively facing disks 24, 26 and perpendicular to respective axis 28, and a lateral wall 34, a first portion of which is defined by a flat wall 35 parallel to respective axis 28, and a second portion of which is defined by a cylindrical wall 36 coaxial with respective axis 28 and connected in sliding manner to respective seat 27. Walls 32, 33, 34 define a chamber 37 communicating in fluidtight manner with respective conduit 29 via an opening 38 formed through wall 36. Frame 31 also comprises a tubular body 39 integral with wall 33, extending through and projecting from wall 33 coaxially with respective axis 28, and mounted for rotation through holes formed through disk 26 and a further disk 40 fitted to tubular body 20a between disk 26 and base 19 and forming part of wheel 20.

Each member 30 also comprises a gripping element 41 in turn comprising a substantially tubular body 42, which is coaxial with a respective axis 43 crosswise to axis 28, is mounted in sliding manner through a hole 44 formed in wall 35, and presents, on the end outside chamber 37, a head 45 crosswise to respective axis 43 and which transversely engages passage 14 to cooperate with the bottom of a respective product 2 on conveyor device 5. Body 42 forms the connecting rod of an articulated parallelogram 46 fitted to frame 31, and presents, on the end inside chamber 37, an axial appendix 47 hinged, by a bolt 48 parallel to axis 22, to the free end of a crank 49, the other end of which is fitted to one end of a shaft 50 mounted for rotation through body 39, coaxially with axis 28, and connected angularly to body 39 by a torsion spring 51. In addition to body 42 and crank 49, parallelogram 46 also comprises a second crank 52, a first end of which is hinged to an appendix 53 extending laterally from head 45, and a second end of which is hinged to walls 32 and 33, outside wall 35.

When shaft 50 is oscillated about axis 28, body 42 is moved back and forth axially in relation to frame 31 and between a withdrawn position (FIG. 3a) and an extracted position (FIG. 3b).

Body 42 is fitted through with a rod 54 coaxial with axis 43 and presenting an outside diameter smaller than the inside diameter of body 42, so as to define, inside body 42, a substantially annular chamber 55 communicating directly with chamber 37. Rod 54 is fitted at one end to a support 56 inside chamber 37 and integral with wall 36, and is fitted at the other end with a truncated-cone-shaped plug 57 which, when body 42 is in the withdrawn position, engages in fluidtight manner a truncated-cone-shaped seat 58 formed on the inner surface of body 42, crosswise to axis 43, and at the opposite end of body 42 to that communicating with chamber 37. Conversely, when body 42 is in the extracted position, plug 57 is detached from seat 58 to permit outside air to be drawn in through head 45.

Figure 4:
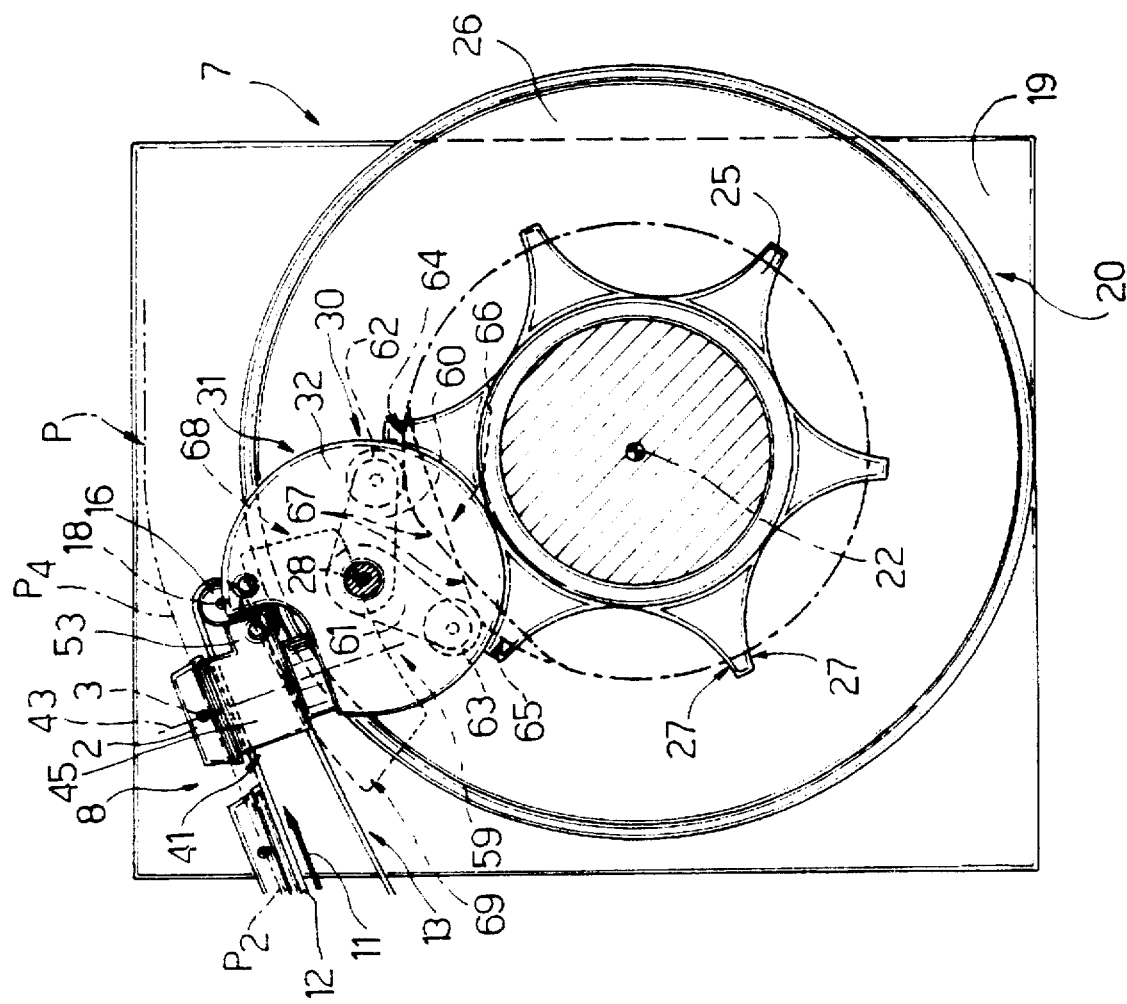
FIG. 4 shows a partially sectioned view, with parts removed for clarity, of a further detail of the FIG. 1 unit.

With reference to FIG. 4, each accelerating member 30 presents a respective control device 59 for controlling the angular position of respective frame 31 about respective axis 28. Each device 59 comprises two arms 60 and 61 extending radially from respective tubular body 39 in directions forming a given angle, and supporting respective tappet rollers 62 and 63 engaging respective side by side tracks 64 and 65 of a fixed bilateral cam 66 fitted through with tubular body 20a and common to all of accelerating members 30. Tracks 64 and 65 are generally circular and coaxial with axis 22, and present respective flat portions 67 offset in relation to each other about axis 22 by an angle equal to that formed by arms 60 and 61, and respectively positioned about axis 22 as described later on.

Each accelerating member 30 also presents an actuating device 68 for oscillating respective shaft 50 about respective axis 28 and so moving respective body 42 between said extracted and withdrawn positions.

As shown in FIGS. 1, 2 and 3, each actuating device 68 comprises an electromagnetic device 69, which is controlled, via control unit CU and as described later on, by a detecting device 70 along portion P2 of path P, and is fixed to base 19 at station 8. Electromagnetic device 69 comprises an electric magnet 71 fitted to base 19 by two brackets 72 and which extends along the whole of station 8 and is common to all electromagnetic devices 69; and a substantially L-shaped armature 73 in turn comprising a first arm defined by a sleeve 74 fitted to a portion of respective shaft 50 projecting from respective tubular body 39, and a second arm defined by a lever 75 crosswise to respective axis 28.

Each actuating device 68 also comprises a cam device 76 in turn comprising a sleeve 77 fitted to respective shaft 50, and two arms 78 and 79 extending radially from respective sleeve 77 in directions forming a given angle, and supporting respective tappet rollers 80 and 81 engaging respective side by side tracks 82 and 83 (the form and function of which are described later on) of a fixed bilateral cam 84 fitted through with tubular body 20a and common to all actuating devices 68.

As shown in FIG. 1, conveyor device 9 comprises a carousel conveyor 85 supported on base 19 over wheel 20 and driven by a motor (not shown), timed with motor 21 of conveyor device 7, so as to rotate about an axis 86 crosswise to axis 22. Conveyor 85 comprises a number of suction cup gripping heads 87 equally spaced about axis 86 and moving with conveyor 85 along a circular path extending through unloading station 10, tangent to portion P4 of path P, and comprising a portion defining portion P3 of path P.

Operation of unit 1 will now be described relative to one accelerating member 30, and as of the instant in which member 30 approaches station 8 with tubular body 42 in a substantially radial position in relation to axis 22.

First of all, however, it should be pointed out, as already stated, that the traveling speed of belts 13 is slower than that of both conveyor device 4 and accelerating member 30, and is such that products 2 are fed to station 8 at the same rate at which members 30 travel through station 8 and heads 87, travel through station 10; and each head 45 travels through station 10 in time with a respective head 87.

As member 30 rotates about axis 22 into a position close to portion P2 of path P and upstream from station 8 in the rotation direction of wheel 20, rollers 62 and 63 contact flat portions 67 of tracks 64 and 65, so that frame 31 is first rotated about axis 28 in the same direction as wheel 20 about axis 22 to position body 42 perpendicular to direction 11, and is then rotated in the opposite direction to wheel 20 to maintain body 42 perpendicular to direction 11 for as long as head 45, inserted inside passage 14, travels through station 8 parallel to portion P2 of path P.

As roller 62, located in front of roller 63 in the traveling direction of accelerating member 30, starts rolling along respective flat portion 67, and frame 31 starts rotating clockwise about axis 28, rollers 80 and 81 start rolling along respective portions of respective tracks 82 and 83, which portions are so designed that only roller 81, located to the rear in the traveling direction of member 30, is maintained contacting track 83 by spring 51 (FIG. 3a), while roller 80 is detached from track 82 and plug 57 remains in the closed position contacting seat 58.

At the same time, detecting device 70 determines the position of a product 2 along conveyor device 5, and supplies control unit CU with position data to enable it to calculate, in known manner, the displacement of product 2 along portion P2, and the location, along portion P2, of a pickup point 88 (FIG. 3b) at which the axis 43 of body 42 intersects the axis 3 of product 2.

As head 45, traveling along passage 14, reaches pickup point 88, and lever 75 is positioned in front of electric magnet 71, control unit CU activates magnet 71 to attract lever 75, so that shaft 50 and crank 49 are rotated about axis 28, body 42 is moved into the extracted position, and, at the same time, plug 57 is detached from seat 58, roller 81 is detached from track 83, and roller 80 contacts track 82. As body 42 moves axially into the extracted position, head 45 moves through portion P2 of path P, transversely to direction 11, to grip product 2 by suction and simultaneously detach it from belts 13.

In connection with the above, it should be pointed out that, at station 8, cam 84 ceases to be bilateral, and, along a portion of station 8, tracks 82 and 83 act as limit stops for maintaining the travel of body 42 within a given range. Also, for as long as rollers 62 and 63 travel along flat portions 67 of respective tracks 64 and 65, body 42 rotates backwards about axis 28 and is maintained perpendicular to direction 11 until product 2 is fed off the end of conveyor device 5; at which point, roller 62 engages the circular portion of track 64, and body 42 is rotated forwards until roller 63 also engages the circular portion of track 65 and body 42 is restored to its original substantially radial position.

On leaving station 8, body 42 feeds product 2 to station 10, while cam 84, again bilateral, maintains body 42 in the extracted position, so that plug 57 remains in the open position up to station 10, where cam 84 provides for withdrawing body 42 and so closing plug 57 and releasing product 2, which is picked up by a respective head 87 and fed in perfectly equally spaced manner along portion P3 of path P.

I claim:

1. A method of equally spacing products (2), the method comprising:
    a feed stage wherein said products (2) are fed at a constant rate along at least part of an initial portion (P1, P2) of a product supply path (P);
    a gripping stage wherein each one of said products (2), when fed along said initial portion (P1, P2) of said path (P), is gripped by a head (45) of a respective accelerating member (30) and fed to an unloading station (10) where said one of said products is transferred to an end portion (P3) of said path (P), each said accelerating member (30) being fed through said unloading station (10) with a predetermined constant spacing and at said constant rate; and
    a final stage wherein said products (2) are fed with said spacing and at said constant rate along said end portion (P3) of said path (P);
    wherein said gripping stage comprises a substage wherein said head (45) is imparted a movement in a direction perpendicular to said initial portion (P1, P2) of said path (P) and through said initial portion (P1, P2) of said path (P) to engage and lift respective said products (2) off said initial portion (P1, P2) of said path (P) at a pickup point (88), said head being moved through said pickup point (88) at an advancement speed greater than a traveling speed of said respective products (2) at said pickup point (88).

2. The method as claimed in claim 1, wherein said feed stage comprises:
    a first substage wherein said products (2) are fed at random along a first portion (P1) of said initial portion (P1, P2) of said path (P); and a second substage wherein said products (2) are slowed down as they travel along a second portion (P2) of said initial portion (P1, P2) of said path (P) so as to compact said products and feed them along said second portion (P2) at said constant rate.

3. The method as claimed in claim 1, wherein each said head (45) is moved through said initial portion (P1, P2) of said path (P) to engage said respective products (2).

4. The method as claimed in claim 1, wherein said pickup point (88) varies from one of said products (2) to another along said initial portion (P1, P2) of said path (P).

5. The method as claimed in claim 4, wherein said gripping stage comprises:

a further substage wherein each said head (45) is moved parallel to said initial portion (P1, P2) of said path (P), each of said products (2) being picked up by a respective said head (45) at a respective said pickup point (88) which is arranged along said second portion (P2) of said initial portion (P1, P2) of said path (P) and at which respective positions of said head (45) and respective products (2) coincide.

6. The method as claimed in claim 5, wherein said products are food products.

7. The method as claimed in claim 1, wherein said gripping stage comprises a further substage for determining how each of said products (2) moves along said second portion of said path (P) and so determining in advance a location of said pickup point (88) along said initial portion (P1, P2) of said path (P).

8. The method as claimed in claim 1 wherein said gripping stage comprises substages of:

positioning each said head (45) in relation to said initial portion (P1, P2) of said path (P) by positioning an axis (43) of said head (45) transversely to said initial portion (P1, P2) of said path (P);

determining at a given point along said initial portion (P1, P2) of said path (P) any misalignment between said products (2) and a respective said head (45); and axially moving said head (45) through said initial portion (P1, P2) of said path (P) to lift a relative one of said products (2) off the initial portion (P1, P2) of the path (P) at said pickup point (88).

9. A unit for equally spacing products (2), the unit comprising:

an input conveyor device (4, 5) and an output conveyor device (9) for respectively feeding a succession of products (2) along an initial portion (P1, P2) and an end portion (P3) of a path (P); and an intermediate conveyor device (7) for successively transferring said products (2) from a pickup point (88) along said initial portion (P1, P2) of said path to an unloading station (10) where said products (2) are transferred to said end portion (P3) of said path, said intermediate and output conveyor devices (7, 9) feeding said products (2) at a rate;

wherein said intermediate conveyor device (7) is an accelerating device (7) comprising a number of equally spaced accelerating members (30) traveling at said rate through said unloading station (10); and each of said accelerating members (30) comprises a gripping head (45) for gripping a respective one of said products (2), each of said accelerating members (30) being movable through said pickup point (88) at an advancement speed greater than a traveling speed of said products (2) and comprising a body (31) supporting said gripping head (45) and movable in a direction perpendicular to said initial portion (P1, P2) of said path to move said gripping head through said initial portion (P1, P2) of said path at said pickup point (88), and to engage and lift said products (2) off said initial portion (P1, P2) of said path at said pickup point (88).

10. The unit as claimed in claim 9, wherein said input conveyor device (4, 5) comprises:

a first (4) and second (5) conveyor device for successively feeding said products (2) along a first portion (P1) and second portion (P2) of said initial portion (P1, P2) of said path respectively;

wherein said second conveyor device (5) extends through a loading station (8) where said products (2) are loaded on to said intermediate conveyor device (7), feeds said products (2) at said rate, and compacts said products (2).

11. The unit as claimed in claim 9, wherein each of said accelerating members (30) comprises actuating means (68) for moving a respective said gripping head (45) through said initial portion (P1, P2) of said path.

12. A unit as claimed in claim 9, wherein said pickup point (88) varies from one of said products (2) to another along said initial portion (P1, P2) of said path.

13. The unit as claimed in claim 12, wherein said intermediate conveyor device (7) comprises transmission means (59) for each of said accelerating members (30) for translating the respective said gripping head (45) parallel to said initial portion (P1, P2) of said path, said pickup point (88) coinciding with a point along said initial portion (P1, P2) of said path at which respective positions of said gripping head (45) and said products (2) correspond.

14. The unit as claimed in claim 9, further comprising detecting means (70) for determining displacement of each of said products (2) along said initial portion (P1, P2) of said path and so determining in advance a location of said pickup point (88) along said initial portion (P1, P2) of said path.

15. The unit as claimed in claim 9, wherein each of said accelerating members (30) comprises:

control means (59) for positioning a respective said gripping head (45) in relation to said initial portion (P1, P2) of said path by positioning an axis (43) of said respective said gripping head (45) transversely to said initial portion (P1, P2) of said path;

detecting means (70) located along said initial portion (P1, P2) of said path for determining, in use and at a given point along said initial portion (P1, P2) of said path, any misalignment between said products (2) and said respective said gripping head (45); and actuating means (68) for axially moving said respective said gripping head (45) through said initial portion (P1, P2) of said path to lift said products (2) off said initial portion (P1, P2) of said path at said pickup point (88).

16. The unit as claimed in claim 15, wherein said intermediate conveyor device (7) also comprises:

a wheel (20) for conveying said accelerating members (30), said wheel (20) comprising a tubular supporting body (20a);

a motor (21) for rotating said tubular supporting body (20a) in a direction at constant angular speed about a first rotation axis (22); and at least one intermediate disk (25) fitted to said tubular body (20a) and having a number of cylindrical peripheral seats (27) equally spaced about said first axis (22) and each having a respective second axis (28) parallel to said first axis (22), each said seat (27) housing a respective one of said accelerating members (30) and being provided with a respective conduit (29) for connection to a suction device.

17. The unit as claimed in claim 16, wherein each said gripping head (45) comprises:

a suction chamber (55) communicating with said conduit (29); and respective engaging means (57) for opening and closing said chamber (55) to retain a respective one of said products (2) as said one of said products is transferred from said pickup point (88) to said unloading station (10).

18. The unit as claimed in claim 17, wherein said control means (59) comprise first cam means (66).

19. The unit as claimed in claim 18, wherein said first cam means (66) are bilateral cam means for rotating each of said accelerating members (30) about said second axis (28) in said direction of said tubular supporting body (20a) about said first axis (22) to move said axis (43) of said gripping head (45) into said transverse position, and for subsequently rotating each of said accelerating members (30) in an opposite direction to said direction of said tubular supporting body (20a), said first cam means (66) comprising, for each of said accelerating members (30), two first arms (60; 61) extending radially from said body (31), forming a given angle, and supporting respective first tappet rollers (62; 63).

20. The unit as claimed in claim 19, wherein said first tappet rollers (62; 63) engage respective substantially circular tracks (64; 65) extending about said first axis (22), said first tracks (64; 65) comprising respective flat portions (67) offset in relation to each other about said first axis (22), by an angle equal to said given angle formed by said first arms (60; 61).

21. The unit as claimed in claim 17, wherein said actuating means (68) comprise second cam means (76, 84) comprising for each of said accelerating members (30) two second radial arms (78; 79) supporting respective second tappet rollers (80; 81), said second tappet rollers (80; 81) engaging respective second substantially circular tracks (82; 83) extending about said first axis (22).

22. The unit as claimed in claim 21, wherein said second cam means (76) are bilateral cam means (84) along at least a portion of said second tracks (82; 83) outside said loading station (8), and, along a portion extending through said loading station (8), act as limit stops for maintaining travel of said gripping head (45) within a given range.

23. A unit as claimed in claim 21, wherein said actuating means (68) further comprises electromagnetic devices (69) comprising an electric magnet (71) extending along all of said loading station (8) and common to all said electromagnetic devices (69), and an armature (73) for each of said accelerating members (30).

* * * * *